United States Patent [19]

Subramanian et al.

[11] Patent Number: 5,887,156

[45] Date of Patent: Mar. 23, 1999

[54] EVOLUTION PLANNING IN A WIRELESS NETWORK

[75] Inventors: Sairam Subramanian, Garland; Seshagiri Madhavapeddy; Alexander J. Montoya, both of Richardson, all of Tex.

[73] Assignee: Northern Telecom Limited, Montreal, Canada

[21] Appl. No.: 723,709

[22] Filed: Sep. 30, 1996

[51] Int. Cl.⁶ .............................. G06F 9/455; H04Q 7/36
[52] U.S. Cl. .................. 395/500; 370/241; 370/913; 455/446
[58] Field of Search ............... 395/500, 200.15, 395/200.01, 200.11; 455/446; 370/913, 241

[56] References Cited

U.S. PATENT DOCUMENTS

| | | | |
|---|---|---|---|
| 5,440,719 | 8/1995 | Hanes et al. ............................. | 395/500 |
| 5,561,841 | 10/1996 | Markus ..................................... | 455/446 |
| 5,598,532 | 1/1997 | Liron ...................................... | 395/200.01 |
| 5,706,436 | 1/1998 | Lewis et al. ........................... | 395/200.11 |
| 5,712,981 | 1/1998 | McKee et al. ......................... | 395/200.15 |

*Primary Examiner*—Dung C. Dinh
*Assistant Examiner*—Chuong Ho
*Attorney, Agent, or Firm*—Kenneth W. Bolvin; W. Glen Johnson; John D. Crane

[57] ABSTRACT

Various operational measurements of a network element are determined in real time. These measurements are used to determine the call carrying capacity of the elements and the reaction of the network element to various call loads. Models of the network elements are generated from the operational measurements. Using an element's model, the network's reaction to various changes in a particular element can be determined without complex and expensive engineering work.

3 Claims, 1 Drawing Sheet

5,887,156

EVOLUTION PLANNING IN A WIRELESS NETWORK

BACKGROUND OF THE INVENTION

1. Field of the Invention

The present invention relates to radio communications. More particularly, the present invention relates to evolution planning using a performance monitoring platform.

2. Description of the Related Art

The rapid increase of wireless telephony has caused radiotelephone service providers to evolve their networks to meet the demand. The evolution planning of a complex cellular network is a difficult task due, in part, to the rapid increase in the number of services and the different components in the network.

Typically, for each new feature or configuration change of the network, such as caller identification or conference calling, the network services engineering groups conduct a thorough study to evaluate the effect of the change on all of the network components. The accuracy of these complex, time consuming tasks is limited by the amount of data that can be collected by the engineering team and the ability to reduce this data to usable information. Additionally, failure to plan properly has resulted in many service outages when system changes were performed. There is a resulting need for a more accurate, faster method for performing cellular network evolution planning.

SUMMARY OF THE INVENTION

The present invention encompasses a method for evolution planning in a wireless network. The wireless network is comprised of a number of elements such as base transceiver stations, mobile switching centers, and base station controllers.

The process operates on the element that is to be cloned. This element has a certain network configuration. Operational measurements from this element may then be taken. The element is then cloned to produce a duplicate representation of the original element, complete with all of the configuration information and connections within the network. If no operational measurements are available, the clone can be developed manually.

The original network configurations of the cloned element are changed to produce a reconfigured element. The reconfigured element is then run and analyzed using the original operational measurements.

DETAILED DESCRIPTION OF THE PREFERRED EMBODIMENT

The process of the present invention creates a duplicate representation of any element in a cellular network. This enables the network engineer to determine the effect, on the network, of configuration changes or software changes of any cloned network element. This is accomplished without changing or interfering with the actual network.

Figure 1:
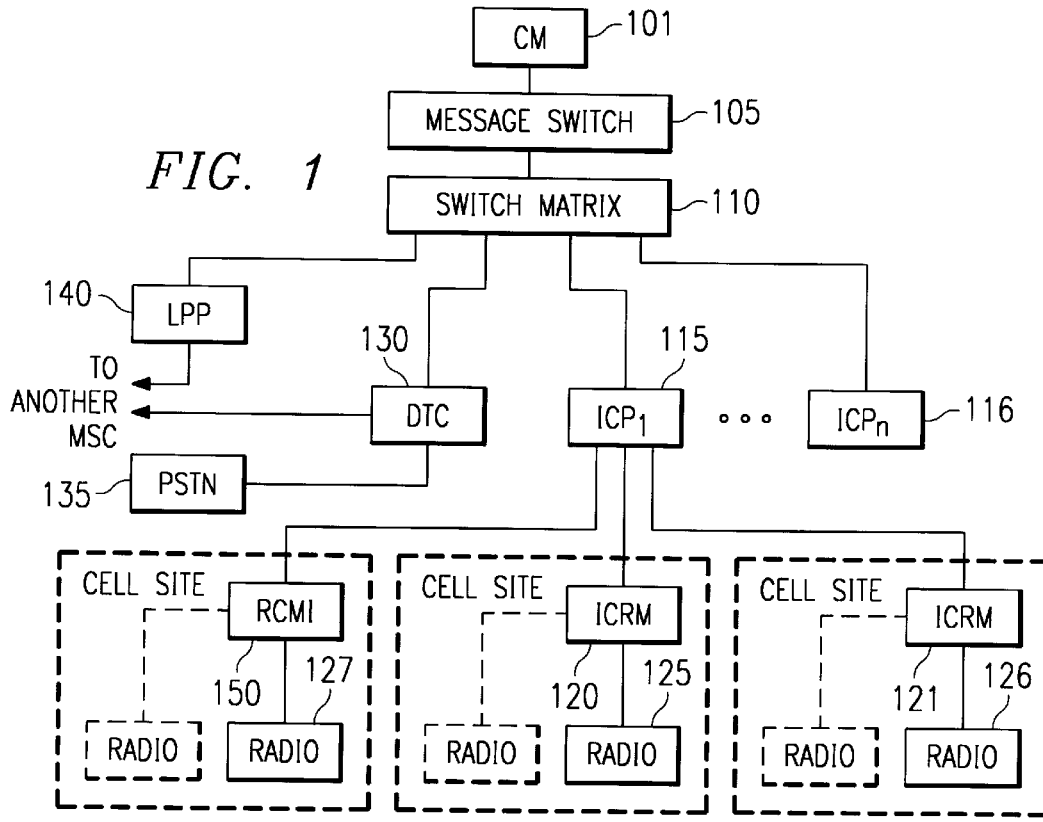
FIG. 1 shows a wireless network of the present invention.

A block diagram of the elements comprising the network of the present invention is illustrated in FIG. 1. The network of FIG. 1 is repeated multiple times to make up a cellular system that covers a geographical region and is handled by a service provider. In the interest of clarity, only one network is shown.

The network is comprised of a computer module (CM) (101) that is the controller for the network and controls all calls in that particular network. A typical cellular system is comprised of from five to seven computer modules.

The message switch (MS) (105) routes messages to other elements of the network, depending on the address embedded in the message. The message switch (105), under control of the computer module (101), routes messages through the switch matrix (110) to the particular port required by the particular message address. The message switch (105) is responsible for data messages while the switch matrix (110) is responsible for voice messages.

The message from the switching matrix (110) is routed to an intelligent cellular peripheral (ICP) (115 and 116). The intelligent cellular peripheral (115 and 116) interfaces the switch matrix to the cell sites. In the preferred embodiment, each intelligent cellular peripheral (115 and 116) can handle from one to eight cell sites and each computer module (101) may handle up to 512 intelligent cellular peripherals. Alternate embodiments have different configurations.

The intelligent cellular peripheral (115 and 116) tracks the state of a call. The state encompasses many things including: whether a hand-off has been requested, whether the call has been handed-off, and whether the subscriber is talking.

In the preferred embodiment, the intelligent cellular peripheral (115 and 116) is coupled to the cell site through a T1 line that is a North American standard signal line. This signal line conducts a pulse code modulated (PCM), 24 channel, serial signal between the intelligent cellular peripheral (115 and 116) and the cell site's intelligent cellular radio module (ICRM) (120 and 121).

Alternate embodiments use other signal standard lines to couple the intelligent cellular peripherals (115 and 116) to the cell site. For example, an alternate embodiment uses an E1 line that uses 30 channel PCM.

The intelligent cellular radio module (120 and 121) is responsible for controlling the radios at the cell site. Each intelligent cellular radio module (120 and 121) can handle multiple radios, each radio being coupled to the intelligent cellular radio module (120 and 121) through a trunk.

The intelligent cellular radio module (120 and 121) takes the messages from the intelligent cellular peripheral (115 and 116) and routes it to the appropriate trunk assigned to the mobile radiotelephone (150) in communication with the radio (125 and 126) assigned to the intelligent cellular radio module (120 and 121).

A remote cellular module interface (RMCI) (150) can also couple the intelligent cellular peripheral (115) to a radio (127). The remote cellular module interface (150) functions similarly to the intelligent cellular radio module (120 and 121) except that the remote cellular module interface (150) operates in an analog cellular only mode whereas the intelligent cellular radio modules (120 and 121) can operate in both the analog and digital cellular modes.

The radios (125–127) are transceivers that are coupled to an intelligent cellular radio module (120 and 121) and communicate with the mobile radiotelephone (150). The radios (125–127) can be of various types such as dual radio units (DRU) for AMPS and time division multiple access (TDMA). In the preferred embodiment, the radios communicate over AMPS radio frequencies. Alternate embodiments communicate in different types of cellular systems, such as code division multiple access (CDMA) systems.

A digital trunk controller (DTC) (130) couples the network to the public switched telephone network (PSTN)

(135). The digital trunk controller's (130) function is similar to the intelligent cellular peripheral, except the digital trunk controller tracks the state of wireline calls. Through the digital trunk controller (130), the radiotelephone (150) can contact a land-line telephone connected to the PSTN (135). Also, telephones connected to the PSTN (135) contact the radiotelephone (150) through the network's digital trunk controller 130).

The link peripheral processor (LPP) (140) couples the network to other networks within the cellular radiotelephone system. This link between networks uses common channel signaling #7 (CCS7) type messaging that is well known in the art. Alternate embodiments use other types of signaling between networks.

The elements of the above described network are explained in greater detail in the advanced mobile phone system (AMPS) standard Electronic Industry Association Recommended Standard-553 (EIA RS-533). The process of the present invention, however, can be used to clone any element of a network, also referred to in the art as nodes, that can be represented by mathematical modeling.

Various events occur in the above described network of FIG. 1. These events generally include basic calls, mobility, networking, and features. These general events are each comprised of a group of particular events.

The basic call group of events is comprised of mobile to land calls, land to mobile calls, and mobile to mobile calls. The mobility group is comprised of hand-offs between cells and hand-overs between sectors of the cell. Also, the mobility group includes hand-ins to an underlying microcell and hand-outs to the overlying cell.

The networking group of events includes call delivery for roaming radiotelephones, intersystem hand-offs, and intersystem registration. The intersystem events occur between different cellular systems that are comprised of multiple networks of the type illustrated in FIG. 1.

The feature group of events includes call forwarding, caller identification, conference calling, and a message waiting indication. The feature events varies between different radiotelephone service providers. Additionally, new features are being developed. The process of the present invention is not affected by new features not presently available.

Each of the elements of the network of FIG. 1 has a maximum call carrying capacity. For example, the CM node has a call carrying capacity of $X_1$, the ICP node has a call carrying capacity of $X_2$, the ICRM node has a call carrying capacity of $X_3$, and the radio has a call carrying capacity of $X_4$.

The call carrying capacity of each node is determined by a network monitor. The monitor tracks, in near real time, the operational measurements of each node as it operates in the network. The operational measurements of a node indicate how the node operates or reacts under a certain call loading condition. The capacity of each node can then be determined from the operational measurements.

The operational measurements of each network node are used to generate a mathematical model that represents that particular node. The node models are then used by the evolution planning process of the present invention to determine the effect changes to any particular node will have to the rest of the network.

For the present invention, operational measurements are not required for proper operation. If the operational measurements are not available, it is possible to generate the models of each node through manual planning. This planning is accomplished using default mathematical models developed from the forecast of frequency and type of events that depend on the expected market demands or requirements. These market requirements are well known in the industry.

In the preferred embodiment, the mathematical representation of a node is given by the equation:

$$\sum_{e=1}^{k} T_e * F_e.$$

This equation states that the performance of the node can be characterized by the set of events {e} where each event e uses T time (processor MIPS) and occurs F times during a monitoring period. The equation is also a function of the hardware and software configuration that is currently in operation in the network. Other models for characterizing performance may exist. The process of the present invention will function with these other models.

Varying the events that occur in the network affects, in a different manner, the call carrying capacity of each of the nodes. For example, increasing the number of feature events available to a system's subscribers affects the call carrying capacity of the computer module. This, in turn, may affect the operation of the rest of the network.

An example of increasing the feature events includes changing the software processes that run each node may affect the rest of the network. Upgrading the software of the computer module to enable it to provide caller identification to subscriber radiotelephones may have an impact on the call carrying capacity of other nodes in the network. The process of the present invention determines the affect of these changes.

As an example of operation of the present invention, the network is used while operational measurements of each node are collected in near real time. These operational measurements are then used to generate mathematical models representing each node. The network is then cloned using the various node models.

If, in the actual network, one intelligent cellular peripheral is running at twenty percent capacity and another intelligent cellular peripheral is running at eighty percent capacity, the cloned system is changed such that each intelligent cellular peripheral is running at fifty percent capacity. This is accomplished by simulating the reconfiguration of the T1 lines between the intelligent cellular peripherals and intelligent cellular radio modules such that each intelligent cellular peripheral is running at fifty percent capacity.

The reaction of the other network nodes is then observed, in the cloned system, to determine if the change is detrimental to any portions of the network. The process of the present invention also optimizes the changes using the cloned system to determine the best way to implement the desired changes.

The above detailed examples of operation are not exhaustive. The evolution planning process operates with any changes that are possible to any of the network nodes.

Figure 2:
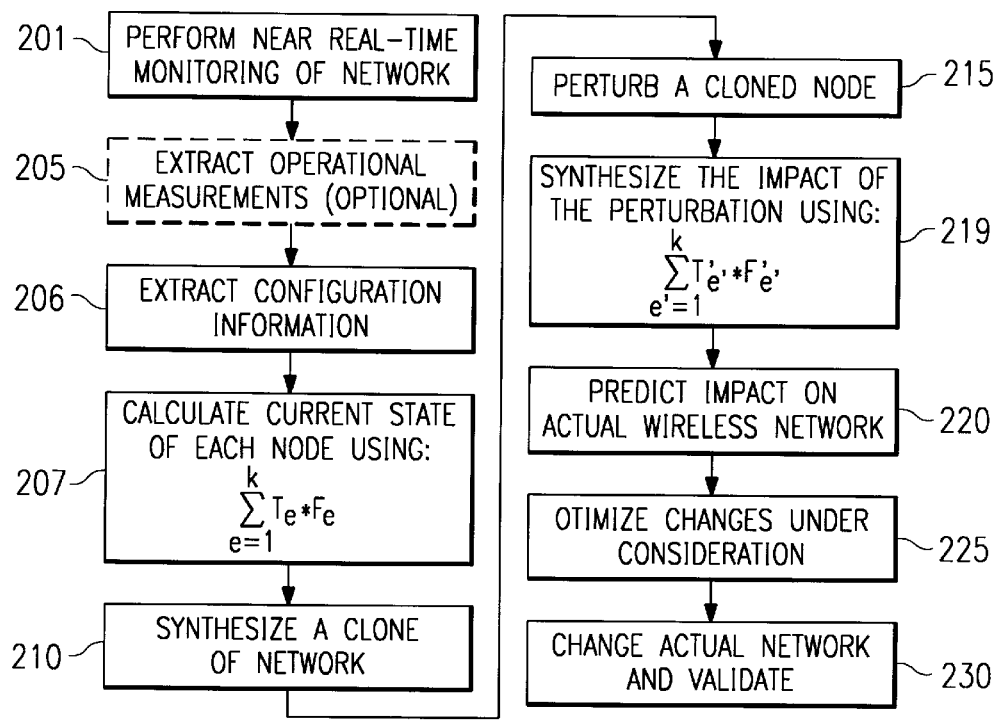
FIG. 2 shows a flowchart of the evolution planning process of the present invention.

The evolution planning process of the present invention is illustrated in FIG. 2. The process starts by performing near real-time monitoring of the network (step 201). The monitoring enables the extraction of the operational measurements for each element of the network (step 205). As previously discussed, the operational measurements include the reaction of the elements to various call loads.

The configuration information for each node is also extracted (206). The node configuration includes the hardware configuration of the node as well as the software currently operating in each node.

The current state of the nodes is then calculated using the above mathematical representation of a node (step 207). The operational measurements are used to synthesize a clone of the wireless network (step 210) in the form of a vector containing two elements. The first vector element is the result of step 207 while the second element is the result of step 205. This step (210) generates a copy of each element of the original network.

A cloned node is then perturbed with network data changes that are under consideration (step 215). These changes can include: a change to the set of events {e}, the time elements {T}, the hardware configuration of the node, the software configuration of the node, or forecasted subscriber usage changes.

The impact of the perturbation on the node is then synthesized using the mathematical representation of the node (step 219). Also, a prediction of the impact is given for the actual operating wireless system (step 220). An example of the impact includes a change in call carrying capacity of one of the other network elements. This step yields the equation:

$$\sum_{e'=1}^{k} T_{e'} * F_{e'}$$

where k', e', T', and F' represent the mathematical representation of the change that is desired.

The process enables many scenarios to be run to optimize the change under consideration (step 225). It is not necessary to just accept the desired change since there may be a more optimum change possible.

Finally, the desired change from the process is made to the network (step 230). A validation effort can also be performed using actual data to verify proper operation of the changed network.

In summary, the evolution planning process of the present invention enables changes to a wireless network to be analyzed without undue expense and engineering effort. By generating operational measurement of each network element and using these measurements to model the elements, a clone of the wireless network is realized. The cloned network can then be changed in any way needed to determine the effect on the rest of the network.

We claim:

1. A method for evolution planning in a wireless network, the network comprising a plurality of nodes, the method comprising the steps of:

operating the plurality of nodes in the wireless network, each node having a configuration;

extracting operational measurements for each node from the operation of each node;

extracting the node configuration;

calculating a current state of each node by $$\sum_{e=1}^{k} T_e * F_e,$$

where e is a particular event, T is a time for the particular event and F is a quantity of occurrences of the particular event;

cloning the wireless network in response to the operational measurements to produce a cloned wireless network;

perturbing the cloned wireless network with a network change;

synthesizing a representation of the cloned wireless network in response to the perturbation;

predicting an impact on the wireless network in response to the representation of the cloned wireless network; and implementing the network change in the wireless network.

2. The method of claim 1 and further including the step of optimizing the representation of the cloned wireless network.

3. A method for evolution planning in a wireless network, the network comprising a plurality of nodes, the method comprising the steps of:

operating the plurality of nodes in the wireless network, each node having a configuration;

extracting operational measurements for each node from the operation of each node;

extracting the node configuration;

calculating a current state of each node;

cloning the wireless network in response to the operational measurements to produce a cloned wireless network;

perturbing the cloned wireless network with a network change;

synthesizing a representation of the cloned wireless network in response to the perturbation by solving $$\sum_{e'=1}^{k} T_{e'} * F_{e'},$$

where e' is a particular event after the perturbation, T' is a time for the particular event and F' is a quantity of occurrences of the particular event;

predicting an impact on the wireless network in response to the representation of the cloned wireless network; and implementing the network change in the wireless network.

* * * * *